US012597340B2

(12) United States Patent
Hwang et al.

(10) Patent No.: US 12,597,340 B2
(45) Date of Patent: Apr. 7, 2026

(54) TRAFFIC LINE DETECTION METHOD AND APPARATUS USING MOVEMENT PATH OF MOVING OBJECT, AND COMPUTER READABLE STORAGE MEDIUM STORING INSTRUCTIONS TO PERFORM TRAFFIC LINE DETECTION METHOD

(71) Applicant: Vueron Technology Co., Ltd, Seoul (KR)

(72) Inventors: Jae Wook Hwang, Seoul (KR); Chang Hwan Chun, Seoul (KR)

(73) Assignee: Vueron Technology Co., Ltd, Seoul (KR)

( * ) Notice: Subject to any disclaimer, the term of this patent is extended or adjusted under 35 U.S.C. 154(b) by 301 days.

(21) Appl. No.: 18/450,783

(22) Filed: Aug. 16, 2023

(65) Prior Publication Data

US 2024/0062650 A1 Feb. 22, 2024

(30) Foreign Application Priority Data

Aug. 16, 2022 (KR) ........................ 10-2022-0102196

(51) Int. Cl.
*G08G 1/00* (2006.01)
*G08G 1/01* (2006.01)
*G08G 1/017* (2006.01)

(52) U.S. Cl.
CPC ......... *G08G 1/0125* (2013.01); *G08G 1/0175* (2013.01)

(58) Field of Classification Search
CPC .... G08G 1/0125; G08G 1/0175; G06V 20/54; G06V 20/40; G06T 2207/30256
See application file for complete search history.

(56) References Cited

U.S. PATENT DOCUMENTS

2014/0226011 A1* 8/2014 Park .......................... G06T 7/60 348/148
2019/0205663 A1* 7/2019 Ji .......................... G06V 20/588
2019/0299988 A1* 10/2019 Sato .................... B60W 30/165
2020/0189592 A1* 6/2020 Jang ...................... B60W 30/10
(Continued)

FOREIGN PATENT DOCUMENTS

KR 10-2019-0081664 A 7/2019
KR 20190081664 A * 7/2019 ........... G06V 20/588
(Continued)

OTHER PUBLICATIONS

Uduwaragoda, E et al. "Generating lane level road data from vehicle trajectories using Kernel Density Estimation," 16th Int'l IEEE Conf on Intelligent Transportation Systems, The Hague, Netherlands, 2013, pp. 384-391 [online], [retrieved Jun. 17, 2025]. <URL: https://ieeexplore.ieee.org/document/6728262> (Year: 2013).*
(Continued)

*Primary Examiner* — Peter D Nolan
*Assistant Examiner* — Peter Y Ning
(74) *Attorney, Agent, or Firm* — Bridgeway IP Law Group, PLLC; Jihun Kim

(57) ABSTRACT

A traffic line detection method includes obtaining a plurality of points at which at least one moving object is detected in a plurality of image frames, detecting a traffic lane using the plurality of points, and detecting a traffic line using the traffic lane.

18 Claims, 13 Drawing Sheets

(56) References Cited

U.S. PATENT DOCUMENTS

2021/0146923 A1* 5/2021 Corneille ............ B60R 16/0231
2021/0209947 A1* 7/2021 Nomura ..................... G06T 7/70
2024/0377205 A1* 11/2024 Kim ................... G01C 21/3848
2025/0130063 A1* 4/2025 Gomezcaballero .......................... G01C 21/3815

FOREIGN PATENT DOCUMENTS

KR 10-2021-0083128 A 7/2021
KR 20210083128 A * 7/2021 ............... H04N 7/18

OTHER PUBLICATIONS

Gwon, G et al. "Generation of a Precise and Efficient Lane-Level Road Map for Intelligent Vehicle Systems," in IEEE Transactions on Vehicular Technology, vol. 66, No. 6, pp. 4517-4533, Jun. 2017 [online], [retrieved Aug. 9, 2025]. Retrieved from the Internet <URL: https://ieeexplore.iee&arnumber=7420749> (Year: 2017).*

E.R.I.A.C.M. Uduwaragoda et al., "Generating Lane Level Road Data from Vehicle Trajectories Using Kernel Density Estimation," Proceedings of the 16th International IEEE Annual Conference on Intelligent Transportation Systems (ITSC 2013), Oct. 6-9, 2013, USA.

Stefan Schroedl et al., "Mining GPS Traces for Map Refinement," Data Mining and Knowledge Discovery, vol. 9, p. 59-87, 2004, Kluwer Academic Publishers, The Netherlands.

David Betaille et al., "Creating Enhanced Maps for Lane-Level Vehicle Navigation," IEEE Transactions on Intelligent Transportation Systems, vol. 11, No. 4, Dec. 2010, IEEE, USA.

Examiner, "Office Action for Korea Application No. 10-2022-0102196", Mar. 14, 2025, KIPO, Republic of Korea.

* cited by examiner

TRAFFIC LINE DETECTION METHOD AND APPARATUS USING MOVEMENT PATH OF MOVING OBJECT, AND COMPUTER READABLE STORAGE MEDIUM STORING INSTRUCTIONS TO PERFORM TRAFFIC LINE DETECTION METHOD

TECHNICAL FIELD

The present disclosure relates to a traffic line detection method and apparatus using a movement path of a moving object, and more particularly, to a method and apparatus for detecting a traffic line using a movement path of a moving object.

BACKGROUND

Various methods for creating digital road maps have been developed in the past with respect to vehicle automation and/or autonomous driving.

The paper by Uruwaragoda et al., "Generating Traffic lane Level Road Data from Vehicle Trajectories Using Kernel Density Estimation" in Proceedings of the 16th International IEEE Annual Meeting on Intelligent Transportation Systems (IT SC 2013), Vol. 201 (2013) discloses a method for estimating the number and widths of traffic lanes on roads, for example. To this end, the centerline of a road is intersected at right angles at discrete intervals based on a roadway-accurate road map. For each of these vertical lines, intersections with trajectories of vehicles on the road are calculated and kernel density estimation is performed. Accordingly, supporting points that contain information on the number of traffic lanes and a traffic lane width and can be finally calculated are generated along the road.

In the paper by Schroedel et al., "Mining GPS Traces for Map Refinement," in Data Mining and Knowledge Discovery (September 2004), the algorithm first divides trajectories of vehicles into segments to identify centerlines without prior knowledge of maps, whereby information on the number of traffic lanes and a land width is derived. In addition, in order to allow statements about traffic lanes, vertical intervals to trajectories of vehicles are sorted along the centerlines through a density estimation method.

In the paper by Betaille et al., "Creating Enhanced Maps for Traffic lane-Level Vehicle Navigation," in IEEE Transactions on Intelligent Transportation Systems (April 2010 and October 2010), a model-based approach in which models described through Clothoid are matched to measured trajectory data of vehicles is pursued.

SUMMARY

An object of the present disclosure is to provide a method and apparatus for detecting a plurality of moving objects in an image frame, estimating movement paths, and detecting a traffic line using the same.

In accordance with an aspect of the present disclosure, there is provided a traffic line detection method to be performed by a traffic line detection apparatus including a memory storing one or more instructions and a processor executing the one or more instructions stored in the memory, the method comprising: obtaining a plurality of points at which at least one moving object is detected in a plurality of image frames; detecting a traffic lane using the plurality of points; and detecting a traffic line using the traffic lane.

In addition, the detecting the traffic line using the traffic lane includes determining the traffic line by extracting centerlines of two adjacent traffic lanes among a plurality of traffic lanes if the plurality of traffic lanes are detected.

In addition, the detecting the traffic line using the traffic lane includes: determining a first traffic line with respect to a first traffic lane among the plurality of detected traffic lanes, detecting a second traffic lane being outside a first region including a plurality of points corresponding to the determined first traffic line among the plurality of detected traffic lanes, and detecting a second traffic line using the detected second traffic lane.

In addition, the detecting the plurality of traffic lanes comprises: determining a first traffic lane from a movement path estimated using the plurality of points; and estimating a second traffic lane by moving the first traffic lane in parallel.

In addition, the determining the first traffic lane comprises: randomly selecting n points (n being a natural number equal to or greater than 3) among the plurality of points, generating a curve using the n points, and determining the first traffic lane based on a number of points adjacent to the curve.

In addition, the estimating the second traffic lane comprises: moving the first traffic lane in parallel in a direction transverse to the first traffic lane within a predetermined movement range, and determining the second traffic lane based on a number of points adjacent to the first traffic lane moved in parallel in the direction transverse to the first traffic lane.

In addition, the estimating the second traffic lane further comprises: moving the second traffic lane in parallel in a direction transverse to the second traffic lane within the predetermined movement range, and determining a third traffic lane based on a number of points adjacent to the second traffic lane moved in parallel in the direction transverse to the second traffic lane.

In addition, the traffic lane includes a region extending by a predetermined width in a direction transverse centered around a line extending by a predetermined distance from an end point among the plurality of points in direction in which the traffic lane extends.

In addition, at least one moving object is detected in each of the plurality of image frames, and a center point of each of the detected at least one moving object is obtained as each of the plurality of points.

In accordance with another aspect of the present disclosure, there is provided a traffic line detection apparatus comprising: a memory configured to store one or more instructions and a plurality of points at which at least one moving object is detected in a plurality of image frames; and a processor executing the one or more instructions stored in the memory, wherein the instructions, when executed by the processor, cause the processor to: detect a traffic lane using the plurality of points, and detect a traffic line using the traffic lane.

In addition, the processor is configured to determine the traffic line by extracting centerline of two adjacent traffic lanes among a plurality of traffic lanes if the plurality of traffic lanes are detected.

In addition, the processor is configured to determine a first traffic line with respect to a first traffic lane among the plurality of detected traffic lanes, detect a second traffic lane being outside a first region including a plurality of points corresponding to the determined first traffic line among the plurality of detected traffic lanes, and detect a second traffic line using the detected second traffic lane.

In addition, the processor is configured to determine a first traffic lane from a movement path estimated using the plurality of points and estimate a second traffic lane by moving the first traffic lane in parallel.

In addition, the processor is configured to randomly select n points (n being a natural number equal to or greater than 3) from the plurality of points, generate a curve using the n points, and determine the first traffic lane based on a number of points adjacent to the curve.

In addition, the processor is configured to move the first traffic lane in parallel in a direction transverse to the first traffic lane within a predetermined movement range and determine the second traffic lane based on a number of points adjacent to the first traffic lane moved in parallel.

In addition, the processor is configured to move the second traffic lane in parallel in a direction transverse to the second traffic lane within the predetermined movement range with respect to the first traffic lane if the second traffic lane within the predetermined movement range is determined, and determine a third traffic lane based on a number of points adjacent to the second traffic lane moved in parallel.

In addition, the traffic lane includes a region extending by a predetermined width in a direction transverse centered around a line extending by a predetermined distance from an end point in direction in which the traffic lane extends among a plurality of points defined for the traffic lane.

In addition, at least one moving object is detected in each of the plurality of image frames, and a center point of each of the detected at least one moving object is obtained as each of the plurality of points.

In accordance with another aspect of the present disclosure, there is provided a non-transitory computer-readable storage medium storing computer executable instructions, wherein the instructions, when executed by a processor, cause the processor to perform a traffic line detection method, the method comprising: obtaining a plurality of points at which at least one moving object is detected in a plurality of image frames; detecting a traffic lane using the plurality of points; and detecting a traffic line using the traffic lane.

According to one aspect of the present disclosure described above, it is possible to detect a plurality of moving objects in an image frame, estimate movement path, and detect a traffic lane using the same by providing a traffic lane detection method and apparatus using a movement path of a moving object.

DETAILED DESCRIPTION

Figure 1:
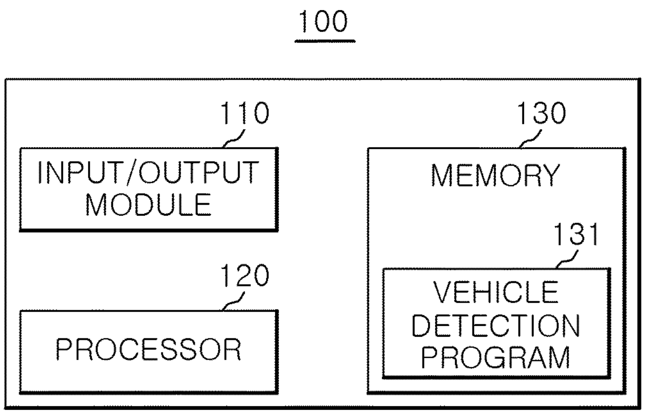
FIG. 1 is a block diagram of a traffic lane detection apparatus according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted to clearly describe the present disclosure.

FIG. 1 is a block diagram of a traffic lane detection apparatus according to an embodiment of the present disclosure.

Referring to FIG. 1, the traffic lane detection apparatus 100 may include an input/output module 110, a processor 120, and a memory 130.

The processor 120 may obtain a plurality of image frames or a plurality of points at which at least one moving object is detected in the plurality of image frames through the input/output module 110.

Here, the image frames may be generated by a separate imaging device. In this case, the imaging device may be installed to capture images of roads. That is, each of the plurality of image frames may include a road and at least one moving object passing through the road.

Further, the plurality of points may be center points of moving objects detected in the image frames.

To this end, the processor 120 may detect at least one moving object in each of the plurality of image frames, and obtain a center point of each of the detected at least one moving object as a point or obtain a point detected by a separate moving object detection device through the input/output module 110.

In this regard, the processor 120 may detect a moving object in an image frame using a known technique. For example, the processor 120 may detect a moving object using a neural network model trained in advance to detect a moving object in an image frame.

The processor 120 may detect a traffic lane using a plurality of points and detect a traffic line using the detected traffic lane.

Here, a traffic lane may be a region set for movement of a moving object, and a traffic line may be a line indicating a boundary between traffic lanes.

Meanwhile, a traffic line detection program 200 and information necessary to execute the traffic line detection program 200 may be stored in the memory 130.

In this specification, the traffic line detection program 200 may refer to software including instructions programmed to detect a traffic lane using a plurality of points and to detect a traffic line using the detected traffic lane.

Accordingly, the processor 120 may load the traffic line detection program 200 and information necessary to execute the traffic line detection program 200 from the memory 130 in order to execute the traffic line detection program 200.

Figure 2:
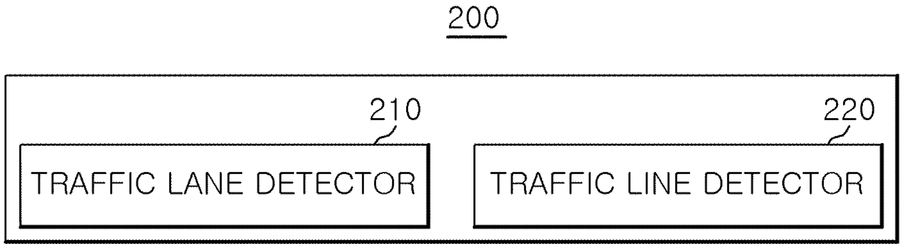
FIG. 2 is a block diagram conceptually illustrating an embodiment of a traffic line detection program of FIG. 1.

Meanwhile, the function and/or operation of the traffic line detection program 200 will be described in detail with reference to FIG. 2.

A traffic lane detector 210 may detect a traffic lane using a plurality of points. To this end, the traffic lane detector 210 may determine a first traffic lane from a movement path estimated using a plurality of points.

For example, the traffic lane detector 210 may randomly select n points (n being a natural number equal to or greater than 3) from a plurality of points, generate a curve using the selected n points, and determine the first traffic lane based on the number of points adjacent to the generated curve.

That is, the traffic lane detector 210 may generate an m-order function curve (m being a natural number equal to or greater than 2) using points selected from a plurality of points and determine the first traffic lane based on the number of points adjacent to the generated m-order function curve.

Depending on an embodiment, the m-order function curve may be determined based on the number of points selected by the traffic lane detector 210. Here, a relationship of $m=n-1$ may be established. For example, in a case in which three points are selected from a plurality of points, the generated curve equation may be a quadratic function curve.

In one embodiment, the traffic lane detector 210 may determine the curve as the first traffic lane if the number of points adjacent to the generated curve exceeds a predetermined threshold value, or may set a predetermined number of different curves and determine a curve having the largest number of points adjacent thereto among the curves as the first traffic lane.

In this regard, the traffic lane detector 210 may determine the first traffic lane for a plurality of points using a random sample consensus (RANSAC) algorithm.

Further, the traffic lane detector 210 may estimate a second traffic lane by moving the first traffic lane in parallel. To this end, the traffic lane detector 210 may move the first traffic lane in parallel in a direction perpendicular to the first traffic lane (e.g., a direction orthogonal to the first traffic lane if the traffic lane is a straight line) within a predetermined movement range.

Here, the predetermined movement range may be set based on a distance between adjacent traffic lanes set to extend in the same direction or based on a distance between adjacent traffic lanes set in the same direction.

Accordingly, a traffic lane detected within the predetermined movement range for a certain traffic lane may be a traffic lane set adjacent to the certain traffic lane to extend in the same direction.

The traffic lane detector 210 may determine the second traffic lane based on the number of points adjacent to the first traffic lane moved in parallel.

In one embodiment, the traffic lane detector 210 may determine the corresponding curve as the second traffic lane if the number of points adjacent to the first traffic lane moved in parallel exceeds a predetermined threshold value, or may move the first traffic lane in parallel at a predetermined distance interval within the movement range to generate a plurality of curves and determine a curve having the largest number of points adjacent thereto among the generated curves as the second traffic lane.

Accordingly, in a case in which the traffic lane detector 210 has successfully determined another traffic lane within the predetermined movement range with respect to a detected traffic lane, the traffic lane detector 210 may detect another traffic lane adjacent to the successfully determined traffic lane.

For example, in a case in which the traffic lane detector 210 has successfully determined the second traffic lane within the predetermined movement range with respect to the first traffic lane, the traffic lane detector 210 may move the second traffic lane in parallel in a direction perpendicular to the second traffic lane within the predetermined movement range and determine a third traffic lane based on the number of points adjacent to the second traffic lane moved in parallel.

As described above, the traffic lane detector 210 may repeatedly perform a process of detecting another traffic lane within a predetermined movement range with respect to any one traffic lane. Accordingly, the traffic lane detector 210 may detect at least one traffic lane having an interval within the predetermined movement range.

Here, the traffic lane detector 210 may stop the process of detecting a traffic lane in a case in which the traffic lane detector 210 fails to determine another traffic lane within a predetermined movement range with respect to a detected traffic lane.

Here, stopping the process of detecting a traffic lane may mean stopping the process of determining another curve by moving the previously detected curve in parallel.

For example, the traffic lane detector 210 may stop estimation of the second traffic lane if it fails to determine the second traffic lane within the predetermined movement range with respect to the first traffic lane.

Meanwhile, a traffic lane may includes a region extending by a predetermined width in a direction transverse centered around a line extending by a predetermined distance from an end point among the plurality of points in a direction in which the traffic lane extends.

To this end, the traffic lane detector 210 may extend each of at least one detected traffic lane by a predetermined distance from an end point in a direction in which the land extends among a plurality of points defined for the traffic lane.

In one embodiment, the predetermined distance may be 30 meters.

Accordingly, a traffic line detector 220 may detect a traffic line using traffic lanes. To this end, upon detecting a plurality of traffic lanes, the traffic line detector 220 may extract centerlines of two adjacent traffic lanes among the plurality of traffic lanes and determine a traffic line.

At this time, for two traffic lanes detected on both outer sides, the traffic line detector 220 may determine an inner traffic line determined by the two traffic lanes on both outer sides, and outer traffic lines for both outer sides based on the distance between the traffic lanes.

Specifically, in an outer traffic lane detected on the outermost side in a direction transverse to any one of a plurality of traffic lanes, the traffic line detector 220 may determine an inner traffic line determined in the inside direction in which another traffic lane is located based on the outer traffic lane, and an outer traffic line for the outer traffic lane based on a distance between outside traffic lanes.

Meanwhile, upon determining at least one traffic lane for detected multiple traffic lanes, the traffic lane detector 210 may repeat a process of detecting multiple traffic lanes outside an area including a plurality of points corresponding to the detected at least one traffic lane.

Accordingly, the traffic line detector 220 may repeat the process of detecting a traffic line using the detected traffic lane according to the operation of the traffic lane detector 210.

In this case, the area including a plurality of points corresponding to the detected at least one traffic lane may be an inner area according to an outer traffic lane determined by the traffic line detector 220.

Figure 3:
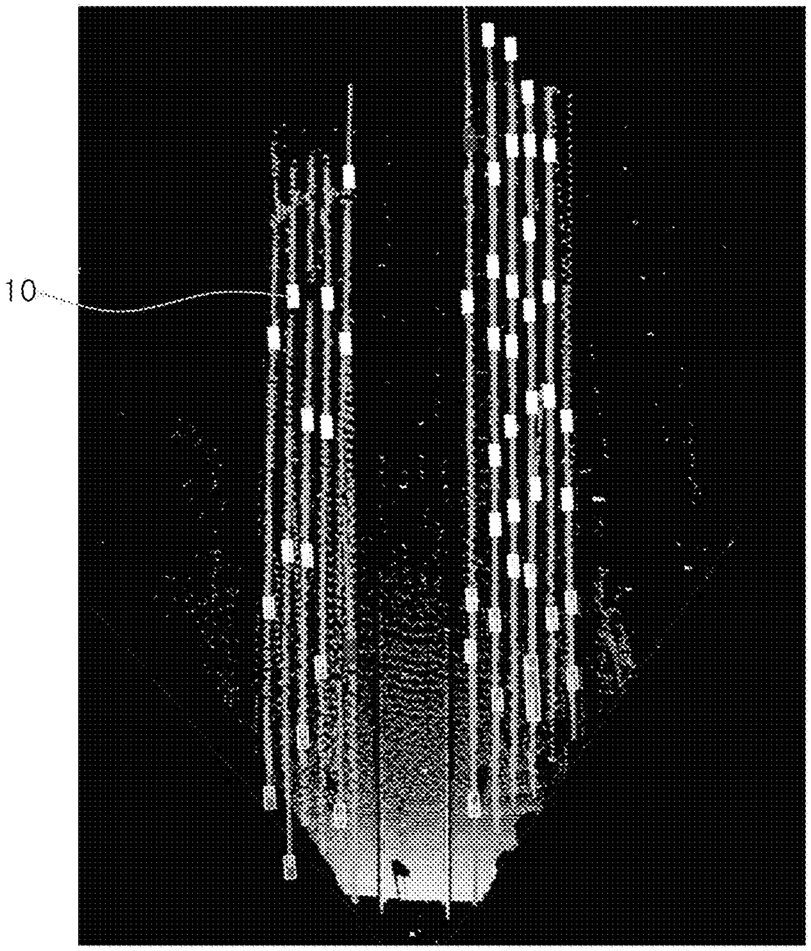
FIG. 3 is a diagram illustrating an embodiment of a plurality of points obtained by a processor of FIG. 1.

FIG. 3 is a diagram illustrating an embodiment of a plurality of points acquired by the processor of FIG. 1.

Referring to FIG. 3, it is possible to check a plurality of moving objects 10 detected in an image frame and points determined for each of the plurality of moving objects 10.

Accordingly, it can be understood that the plurality of points is generated to indicate movement paths for the plurality of moving objects 10.

Figure 4:
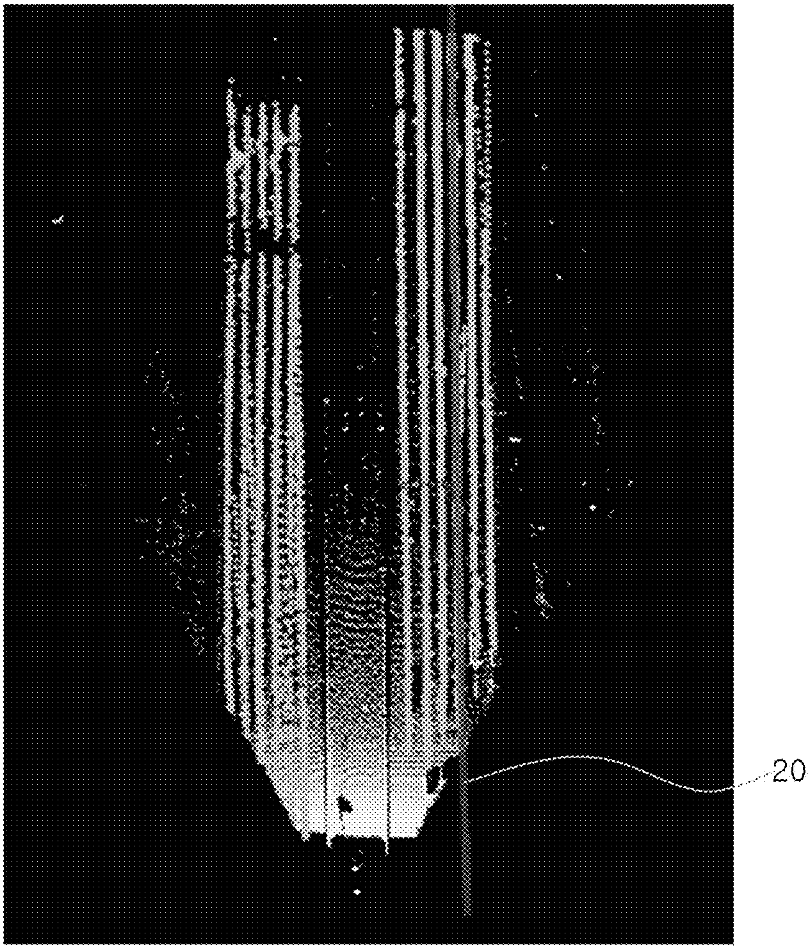
FIG. 4 is a diagram illustrating an embodiment of a first traffic lane generated by the processor of FIG. 1.
Figure 5:
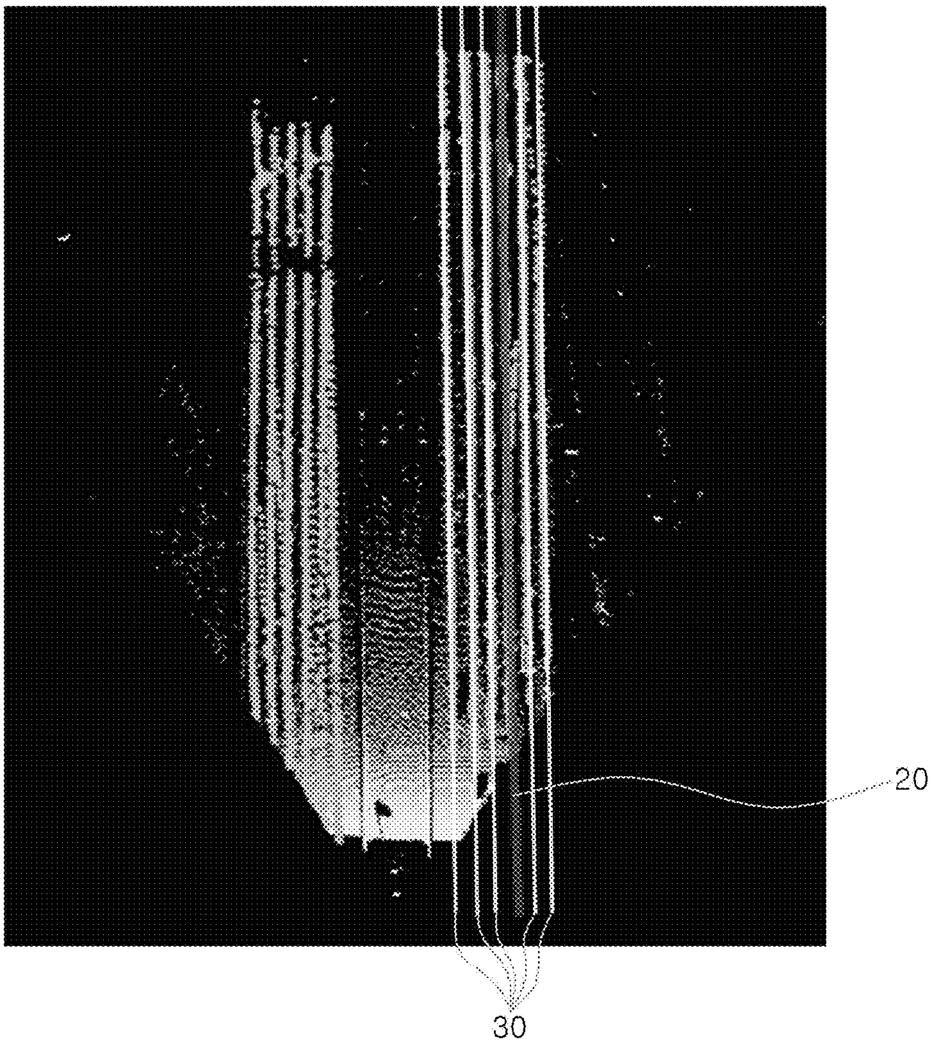
FIG. 5 is a diagram illustrating an embodiment of a second traffic lane generated by the processor of FIG. 1.

FIG. 4 is a diagram illustrating an embodiment of the first traffic lane generated by the processor of FIG. 1, and FIG. 5 is a diagram illustrating an embodiment of the second traffic lane generated by the processor of FIG. 1.

Referring to FIG. 4, the first traffic lane 20 generated for a plurality of points can be identified. Referring to FIG. 5, the second traffic lane 30 generated for a plurality of points based on the first traffic lane 20 can be identified.

In this manner, the processor 120 may determine the first traffic lane 20 from a movement path estimated using a plurality of points and estimate the second traffic lane 30 by moving the first traffic lane 20 in parallel.

Figure 6:
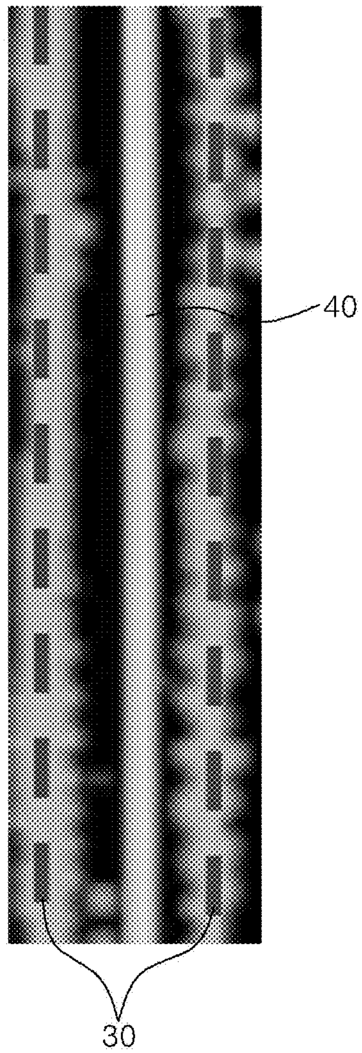
FIGS. 6 to 8 are diagrams illustrating an embodiment of traffic lanes generated by the processor of FIG. 1.
Figure 7:
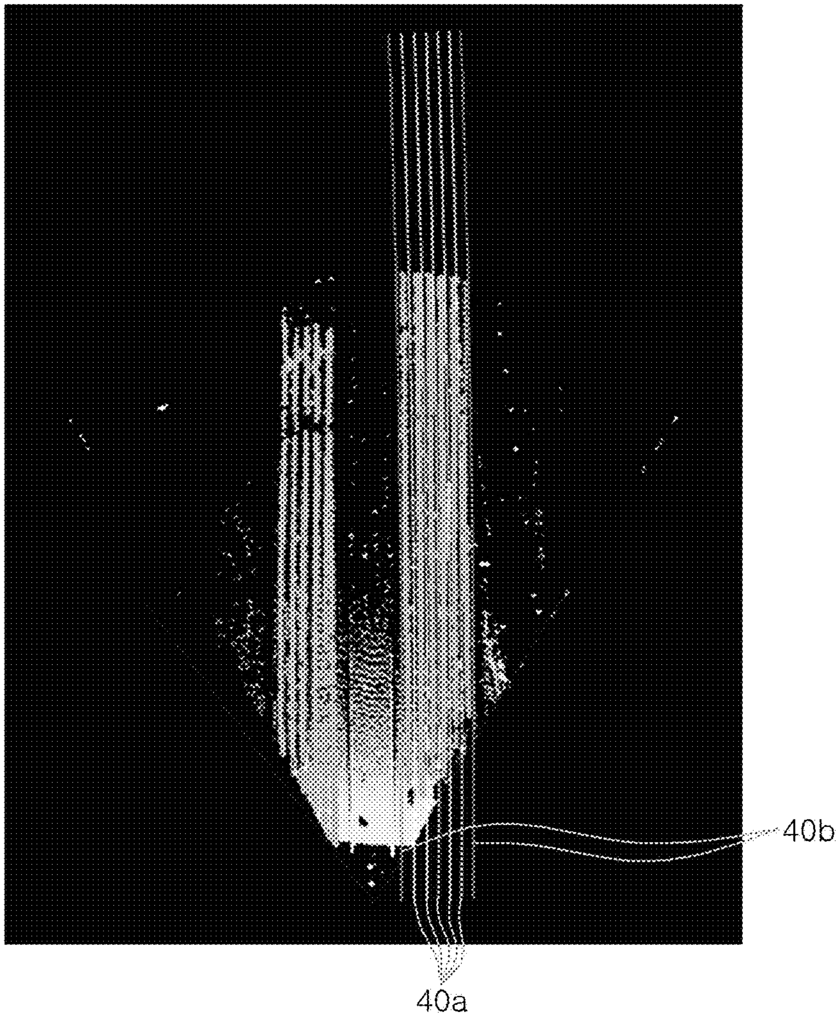
Figure 8:
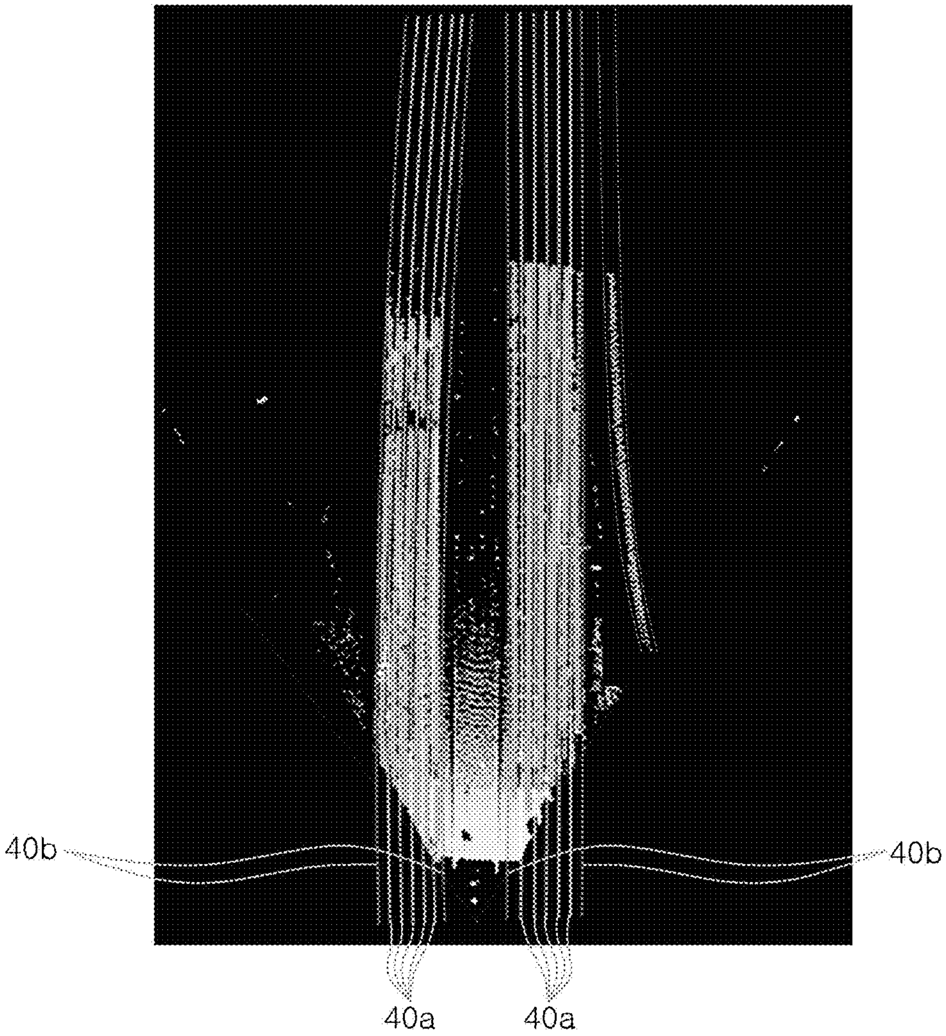

FIGS. 6 to 8 are diagrams illustrating an embodiment of traffic lanes generated by the processor of FIG. 1.

Referring to FIG. 6, a traffic line 40 detected using centerlines of two different traffic lanes 30 may be identified. Referring to FIG. 7, a plurality of traffic lanes 40 determined for a plurality of points may be identified.

In this manner, upon detecting a plurality of traffic lanes, the processor 120 may determine the traffic line 40 by extracting the centerlines of two adjacent traffic lanes among the plurality of traffic lanes.

At this time, in outer traffic lanes detected on outermost sides in a direction transverse to any one of a plurality of traffic lanes, the processor 120 may determine inner traffic lines 40*a* determined in the inside direction in which other traffic lane are located based on the outer traffic lanes, and outer traffic lines 40*b* in the outside direction with respect to the outer traffic lanes based on the distance between the outer traffic lanes.

Referring to FIG. 8, it is possible to check a plurality of traffic lanes 40 determined in the entire area of the image frame.

In this manner, upon determining at least one traffic line 40 with respect to a plurality of detected traffic lanes, the processor 120 may repeat the process of detecting a plurality of traffic lanes and the process of detecting the traffic line 40 using the detected traffic lanes outside an area including the plurality of points corresponding to the detected at least one traffic line 40.

Figure 9:
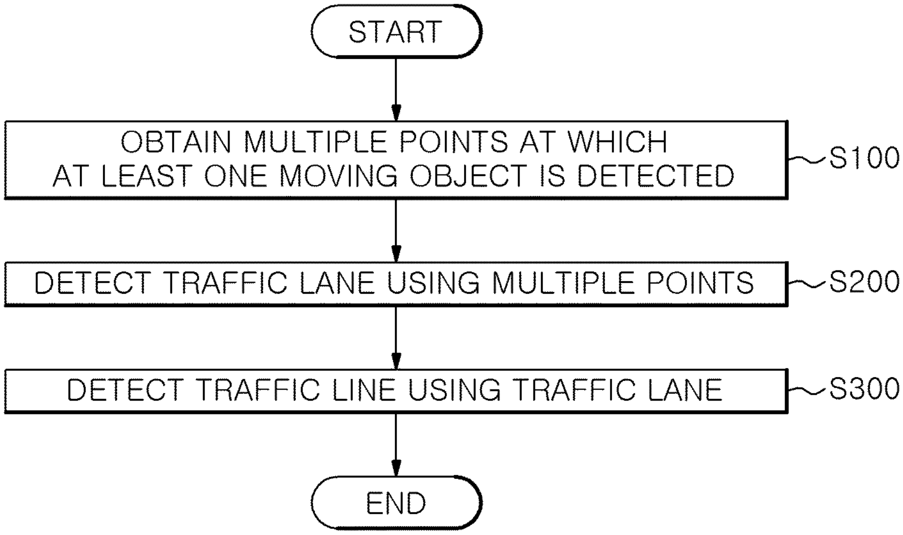
FIG. 9 is a flowchart of a traffic lane detection method according to an embodiment of the present disclosure.

FIG. 9 is a flowchart of a traffic lane detection method according to an embodiment of the present disclosure.

Referring to FIG. 9, the processor 120 may obtain a plurality of points at which at least one moving object is detected in a plurality of image frames (S100).

Accordingly, the processor 120 may detect a traffic lane using the plurality of points (S200) and may detect a traffic line using the detected traffic lane (S300).

Figure 10:
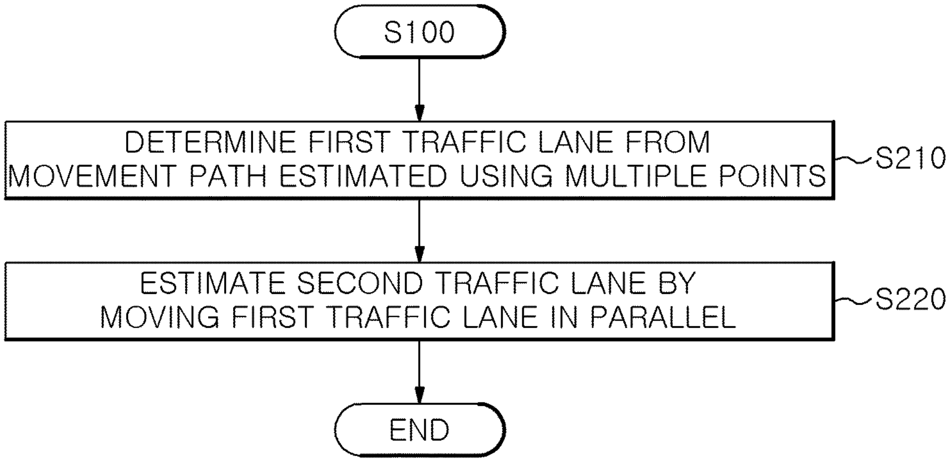
FIG. 10 is a detailed flowchart of a step of detecting a traffic lane using a plurality of points in FIG. 9.

FIG. 10 is a detailed flowchart of the step of detecting a traffic lane using a plurality of points in FIG. 9.

Referring to FIG. 10, the processor 120 may determine a first traffic lane from a movement path estimated using a plurality of points (S210).

Accordingly, the processor 120 may estimate a second traffic lane by moving the first traffic lane in parallel (S220).

Figure 11:
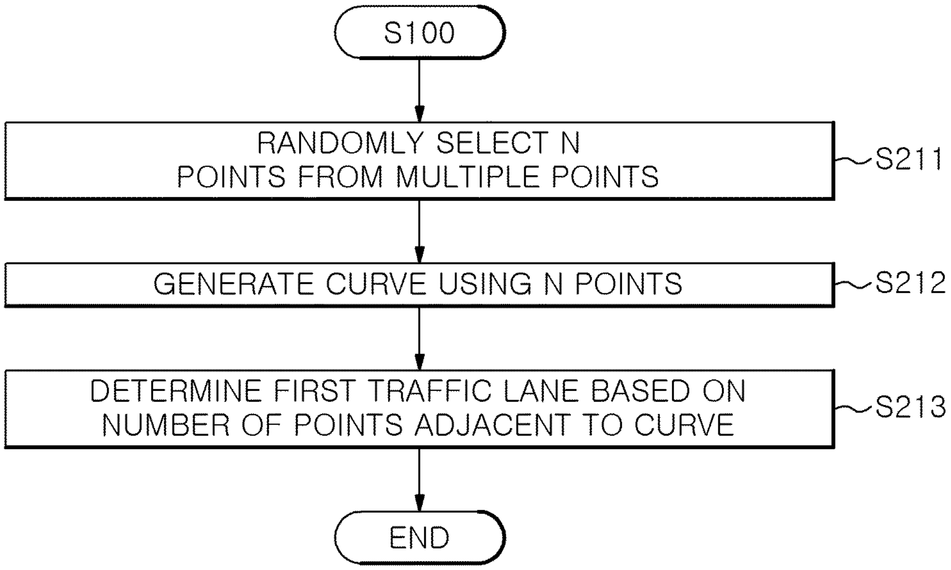
FIG. 11 is a detailed flowchart illustrating a step of determining a first traffic lane from a movement path estimated using a plurality of points in FIG. 10.

FIG. 11 is a detailed flowchart illustrating the step of determining the first traffic lane from a movement path estimated using a plurality of points in FIG. 10.

Referring to FIG. 11, the processor 120 may randomly select n points from a plurality of points (S211) and generate a curve using the selected n points (S212).

Accordingly, the processor 120 may determine the first traffic lane based on the number of points adjacent to the curve (S213).

Figure 12:
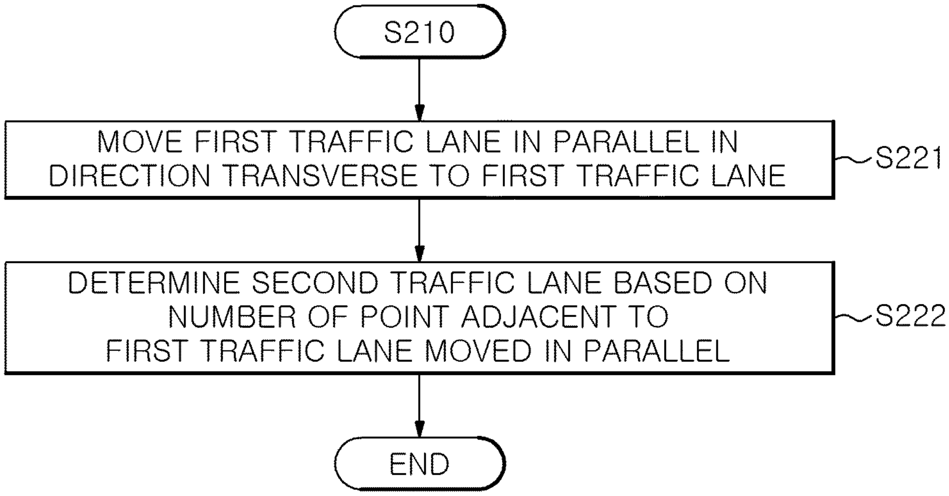
FIG. 12 is a detailed flowchart of a step of estimating a second traffic lane by moving the first traffic lane in parallel in FIG. 10.

FIG. 12 is a detailed flowchart of the step of estimating the second traffic lane by moving the first traffic lane in parallel in FIG. 10.

Referring to FIG. 12, the processor 120 may move the first traffic lane in parallel in a direction transverse to the first traffic lane within a predetermined movement range (S221).

Accordingly, the processor 120 may determine the second traffic lane based on the number of points adjacent to the first traffic lane moved in parallel (S222).

Figure 13:
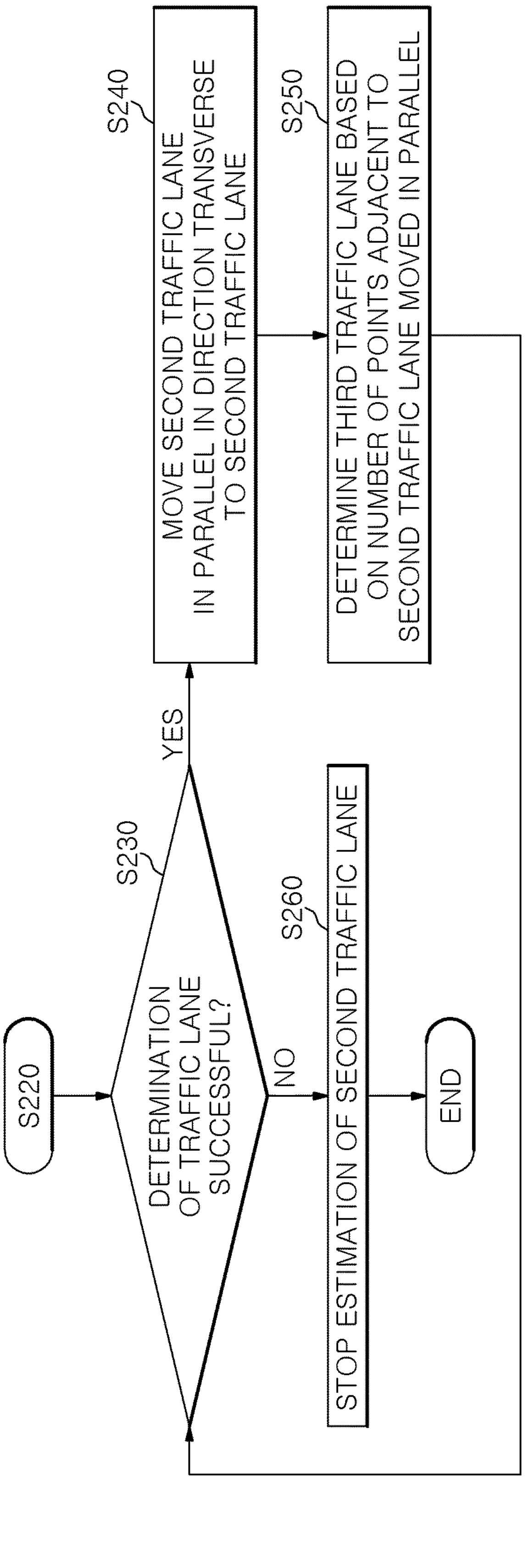
FIG. 13 is a detailed flowchart of a step of detecting a traffic lane using a plurality of points in FIG. 9.

FIG. 13 is a detailed flowchart of the step of detecting a traffic lane using a plurality of points in FIG. 9.

Referring to FIG. 13, the processor 120 may determine whether determination of the second traffic lane with respect to the first traffic lane within the movement range is successful (S230).

At this time, the processor 120 may move the second traffic lane in parallel in a direction transverse to the second traffic lane within the movement range if determination of the second traffic lane with respect to the first traffic lane within the movement range is successful (S240).

In this case, the processor 120 may determine a third traffic lane based on the number of points adjacent to the second traffic lane moved in parallel (S250).

On the other hand, the processor 120 may stop estimation of the second traffic lane in a case in which the processor 120 fails to determine the second traffic lane within the movement range with respect to the first traffic lane (S260).

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A traffic line detection method of an autonomous driving vehicle for collision avoidance to be performed by a traffic line detection apparatus of the autonomous driving vehicle including a memory storing one or more instructions and a processor executing the one or more instructions stored in the memory, the method comprising:

obtaining a plurality of points at which at least one moving object is detected in a plurality of image frames generated by an imaging device;

detecting, using a moving object detection device, a traffic lane based on the plurality of points, wherein the detecting the traffic lane comprises:

determining a first traffic lane from a movement path estimated using the plurality of points; and estimating a second traffic lane by moving the first traffic lane in parallel; and detecting a traffic line using the traffic lane; and prompting the autonomous driving vehicle, upon determination of lane change by the at least one moving object, to avoid a collision with the at least one moving object by accelerating, decelerating or changing a lane of the autonomous driving vehicle across the traffic line.

2. The traffic line detection method to be performed by the traffic line detection apparatus including the memory storing one or more instructions and the processor executing the one or more instructions stored in the memory of claim 1, wherein the detecting the traffic line using the traffic lane includes determining the traffic line by extracting centerlines of two adjacent traffic lanes among a plurality of traffic lanes if the plurality of traffic lanes is detected.

3. The traffic line detection method to be performed by the traffic line detection apparatus including the memory storing one or more instructions and the processor executing the one or more instructions stored in the memory of claim 2, wherein the detecting the traffic line using the traffic lane includes:

determining a first traffic line with respect to the first traffic lane among a plurality of detected traffic lanes, detecting the second traffic lane being outside a first region including a plurality of points corresponding to the determined first traffic line among the plurality of detected traffic lanes, and detecting a second traffic line using the detected second traffic lane.

4. The traffic line detection method to be performed by the traffic line detection apparatus including the memory storing one or more instructions and the processor executing the one or more instructions stored in the memory of claim 1, wherein the determining the first traffic lane comprises:

randomly selecting n points (n being a natural number equal to or greater than 3) among the plurality of points;

generating a curve using the n points; and determining the first traffic lane based on a number of points adjacent to the curve.

5. The traffic line detection method to be performed by the traffic line detection apparatus including the memory storing one or more instructions and the processor executing the one or more instructions stored in the memory of claim 1, wherein the estimating the second traffic lane comprises:

moving the first traffic lane in parallel in a direction transverse to the first traffic lane within a predetermined movement range; and determining the second traffic lane based on a number of points adjacent to the first traffic lane moved in parallel in the direction transverse to the first traffic lane.

6. The traffic line detection method to be performed by the traffic line detection apparatus including the memory storing one or more instructions and the processor executing the one or more instructions stored in the memory of claim 5, wherein the estimating the second traffic lane further comprises:

moving the second traffic lane in parallel in a direction transverse to the second traffic lane within the predetermined movement range; and determining a third traffic lane based on a number of points adjacent to the second traffic lane moved in parallel in the direction transverse to the second traffic lane.

7. The traffic line detection method to be performed by the traffic line detection apparatus including the memory storing one or more instructions and the processor executing the one or more instructions stored in the memory of claim 1, wherein the traffic lane includes a region extending by a predetermined width in a direction transverse centered around a line extending by a predetermined distance from an end point among the plurality of points in direction in which the traffic lane extends.

8. The traffic line detection method to be performed by the traffic line detection apparatus including the memory storing one or more instructions and the processor executing the one or more instructions stored in the memory of claim 1, wherein at least one moving object is detected in each of the plurality of image frames, and a center point of each of the detected at least one moving object is obtained as each of the plurality of points.

9. A traffic line detection apparatus of an autonomous driving vehicle for collision avoidance, the apparatus comprising:

a memory configured to store one or more instructions and a plurality of points at which at least one moving object is detected in a plurality of image frames generated by an imaging device; and a processor executing the one or more instructions stored in the memory, wherein the instructions, when executed by the processor, cause the processor to:

detect, using a moving object detection device, a traffic lane based on the plurality of points, wherein the traffic lane is detected by:

determining a first traffic lane from a movement path estimated using the plurality of points, and estimating a second traffic lane by moving the first traffic lane in parallel, and detect a traffic line using the traffic lane; and prompt the autonomous driving vehicle, upon determination of lane change by the at least one moving object, to avoid a collision with the at least one moving object by accelerating, decelerating or changing a lane of the autonomous driving vehicle across the traffic line.

10. The traffic line detection apparatus of claim 9, wherein the processor is configured to determine the traffic line by extracting centerline of two adjacent traffic lanes among a plurality of traffic lanes if the plurality of traffic lanes is detected.

11. The traffic line detection apparatus of claim 10, wherein the processor is configured to determine a first traffic line with respect to the first traffic lane among the detected plurality of traffic lanes, detect the second traffic lane being outside a first region including a plurality of points corresponding to the determined first traffic line among the detected plurality of traffic lanes, and detect a second traffic line using the detected second traffic lane.

12. The traffic line detection apparatus of claim 10, wherein the traffic lane includes a region extending by a predetermined width in a direction transverse centered around a line extending by a predetermined distance from an end point in direction in which the traffic lane extends among a plurality of points defined for the traffic lane.

13. The traffic line detection apparatus of claim 9, wherein the processor is configured to randomly select n points (n being a natural number equal to or greater than 3) from the plurality of points, generate a curve using the n points, and determine the first traffic lane based on a number of points adjacent to the curve.

14. The traffic line detection apparatus of claim 9, wherein the processor is configured to move the first traffic lane in parallel in a direction transverse to the first traffic lane within a predetermined movement range and determine the second traffic lane based on a number of points adjacent to the first traffic lane moved in parallel.

15. The traffic line detection apparatus of claim 14, wherein the processor is configured to move the second traffic lane in parallel in a direction transverse to the second traffic lane within the predetermined movement range with respect to the first traffic lane if the second traffic lane within the predetermined movement range is determined, and determine a third traffic lane based on a number of points adjacent to the second traffic lane moved in parallel.

16. The traffic line detection apparatus of claim 9, wherein at least one moving object is detected in each of the plurality of image frames, and a center point of each of the detected at least one moving object is obtained as each of the plurality of points.

17. A non-transitory computer readable storage medium storing computer executable instructions, wherein the instructions, when executed by a processor, cause the processor to perform a traffic line detection method of an autonomous driving vehicle for collision avoidance, the method comprising:

obtaining a plurality of points at which at least one moving object is detected in a plurality of image frames generated by an imaging device;

detecting, using a moving object detection device, a traffic lane based on the plurality of points, wherein the detecting the traffic lane comprises:

determining a first traffic lane from a movement path estimated using the plurality of points; and estimating a second traffic lane by moving the first traffic lane in parallel; and detecting a traffic line using the traffic lane; and prompting the autonomous driving vehicle, upon determination of lane change by the at least one moving object, to avoid a collision with the at least one moving object by accelerating, decelerating or changing a lane of the autonomous driving vehicle across the traffic line.

18. The non-transitory computer readable storage medium of claim 17, wherein the detecting of the traffic line using the traffic lane includes determining the traffic line by extracting centerlines of two adjacent traffic lanes among a plurality of traffic lanes if the plurality of traffic lanes is detected.

* * * * *